(12) United States Patent
Hadas et al.

(10) Patent No.: US 9,253,371 B2
(45) Date of Patent: Feb. 2, 2016

(54) PRESS COLOR STATE ESTIMATOR

(75) Inventors: Kogan Hadas, Haifa (IL); Doron Shaked, Haifa (IL); Lior Katz, Nes Ziona (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/362,571

(22) PCT Filed: Dec. 27, 2011

(86) PCT No.: PCT/US2011/067344
§ 371 (c)(1),
(2), (4) Date: Jun. 3, 2014

(87) PCT Pub. No.: WO2013/100895
PCT Pub. Date: Jul. 4, 2013

(65) Prior Publication Data
US 2014/0368846 A1    Dec. 18, 2014

(51) Int. Cl.
*H04N 1/46* (2006.01)
*H04N 1/60* (2006.01)
*G06K 15/02* (2006.01)
*H04N 1/00* (2006.01)

(52) U.S. Cl.
CPC .......... *H04N 1/6002* (2013.01); *G06K 15/1878* (2013.01); *H04N 1/00278* (2013.01); *H04N 1/6041* (2013.01)

(58) Field of Classification Search
None
See application file for complete search history.

(56) References Cited

U.S. PATENT DOCUMENTS

| 6,141,120 | A | 10/2000 | Falk |
| 6,575,095 | B1 * | 6/2003 | Mahy et al. .................. 101/485 |
| 7,207,645 | B2 * | 4/2007 | Busch et al. ................... 347/19 |
| 7,239,402 | B2 | 7/2007 | Soler et al. |
| 7,486,414 | B2 * | 2/2009 | Arai ............................... 358/1.9 |
| 7,489,422 | B2 * | 2/2009 | Zuber ........................... 358/1.9 |
| 8,477,373 | B2 * | 7/2013 | Kouguchi ..................... 358/1.9 |
| 9,010,900 | B1 * | 4/2015 | Armbruster et al. ........... 347/15 |
| 2007/0285636 | A1 * | 12/2007 | Hayashi ........................ 355/32 |
| 2008/0055666 | A1 * | 3/2008 | Gila et al. .................... 358/448 |
| 2008/0297844 | A1 * | 12/2008 | Dokuni ....................... 358/1.15 |
| 2010/0067928 | A1 * | 3/2010 | Ozawa ........................... 399/39 |

(Continued)

FOREIGN PATENT DOCUMENTS

EP    1649409 A1    11/2006

OTHER PUBLICATIONS

Interntional Search Report and Written Opinion of the International Searching Authority; International Application No. PCT/US2011/067344; International Filing Date: Dec. 27, 2011.

*Primary Examiner* — Dung Tran (57) ABSTRACT

A system can comprise a memory to store machine readable instructions and a processing unit to access the memory and execute the machine readable instructions. The machine readable instructions can comprise a press color state (PCS) estimator to calculate an optical density for each of four single separation solid colors based on a color measurement provided by a scanner. The color measurement can characterize material printed on a substrate and scanned by a scanner. The PCS estimator can also provide an updated LUT for each of the four single separation colors based on the color measurement provided by the scanner. The machine readable instructions can comprise a print controller to provide the optical density for each of the four single separation solid colors and the updated LUT to a printer to facilitate color calibration of the printer.

17 Claims, 7 Drawing Sheets

(56) References Cited

U.S. PATENT DOCUMENTS

| | | |
|---|---|---|
| 2010/0182649 A1 | 7/2010 | Monga |
| 2010/0302597 A1* | 12/2010 | Sugiyama .................... 358/3.27 |
| 2011/0032545 A1 | 2/2011 | Mestha |
| 2011/0096365 A1 | 4/2011 | Benedicto |
| 2011/0176155 A1 | 7/2011 | Toriyabe |

* cited by examiner

PRESS COLOR STATE ESTIMATOR

RELATED APPLICATIONS

The present invention is a U.S. National Stage under 35 USC 371 patent application, claiming priority to Serial No. PCT/US2011/067344, filed on 27 Dec. 2011, the entirety of which is incorporated herein by reference.

BACKGROUND

In computing, an image scanner—often abbreviated to just scanner—is a device that optically scans images, printed text, handwriting, or an object, and converts it to a digital image. Scanners can use a charge-coupled device (CCD) or a Contact Image Sensor (CIS) as an image sensor. A rotary scanner can be employed for high-speed document scanning and can employ a CCD array. Scanners read red-green-blue color (RGB) data from the CCD array. This data is then processed to correct for different exposure conditions, and sent to a computer via an input/output interface.

DETAILED DESCRIPTION

Figure 1:
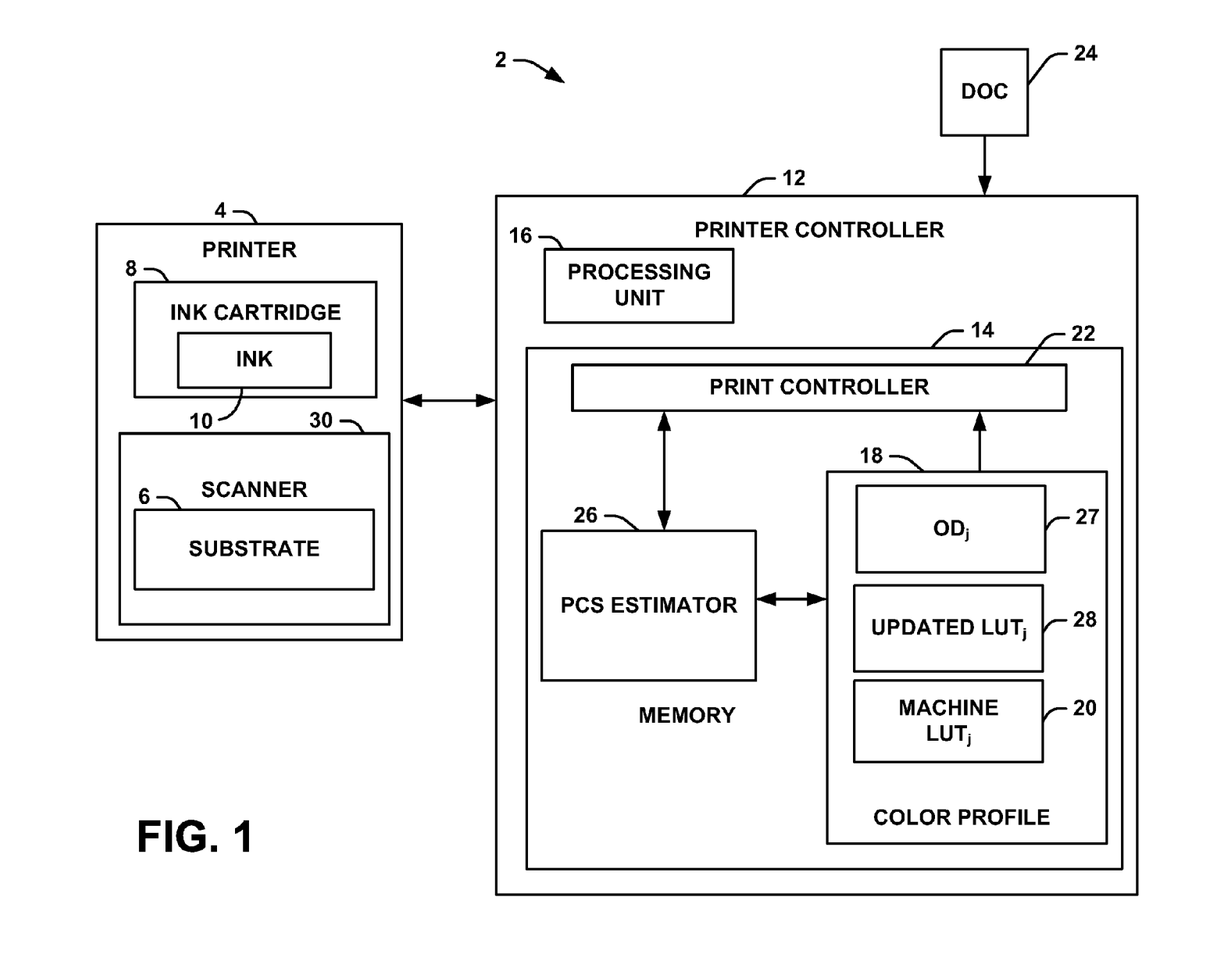
FIG. 1 illustrates an example of a printing system for facilitating color calibration of a printer.

FIG. 1 illustrates an example of a print system 2. The print system 2 can include a printer 4 that can print in color onto a substrate 6. The printer 4 could be implemented, for example, as a thermographic printer (e.g. a thermal ink transfer printer), a laser printer, an inkjet printer, etc. The substrate 6 can be, for example, standard paper, newsprint paper, glossy paper, a banner, a billboard, a combination thereof, etc. The printer 4 can have a cartridge 8 loaded with ink 10. The ink 10 could be implemented, for example, as color printer ink, or color toner. In some examples, multiple cartridges 8 could be employed wherein each such cartridge 8 stores a single color, while in other examples multiple ink colors could be implemented in a single cartridge 8.

For purposes of simplification of explanation, in the present example, different components of the print system 2 are illustrated and described as performing different functions. However, in other examples, the functions of the described components can be performed by different components, and the functionality of several components can be combined and executed on a single component. The components can be implemented, for example, as machine readable instructions, hardware (e.g., an application specific integrated circuit), or as a combination of both (e.g., firmware). In other examples, the components could be distributed among remote devices across a network (e.g., external web services).

The printer 4 can be controlled by a printer controller 12. In some examples, the printer controller 12 could be integrated with the printer 4. In other examples, the printer controller 12 could be implemented as a separate computer, such as a personal computer or a server. The printer controller 12 can include a memory 14 for storing machine readable instructions. The printer controller 12 can also include a processing unit 16 for accessing the memory 14 and executing the machine readable instructions. The processing unit 16 can be implemented, for example, as a processor core. The memory 14 can include a color profile 18 for the printer 4. The color profile 18 could a set of data that characterizes a color input or output device, or a color space. The color profile 18 can include a machine look-up table ($LUT_j$) 20 for the printer 4. The machine $LUT_j$, $j \in \{c,m,y,k\}$ 20 could be implemented, for example, as a matrix that defines a relationship between an input color value (e.g, a cyan, magenta, yellow or black color (CMYK) value) and an output color value (e.g., a CMYK value). The machine $LUT_j$, $j \in \{c,m,y,k\}$ 20 can compensate for physical characteristics of the printer 4, such as the type of ink 10, the type of substrate 6, etc. The machine $LUT_j$, $j \in \{c,m,y,k\}$ 20 can be implemented as four different LUTs, each corresponding to a different printed color j. In such a situation, the machine LUT for cyan (c) can be denoted as machine $LUT_c$. Similarly, the machine LUTs for magenta (m), yellow (y) and black (k) can be denoted as machine $LUT_m$, machine $LUT_y$, machine $LUT_k$, respectively. In this manner each of the machine $LUT_j$, $j \in \{c,m,y,k\}$ 20 can be implemented as single separation lookup tables.

The printer 4 can be a self color calibrating printer. The press color state (PCS) of the printer 4 can denote a set of press parameters for the printer 4 that allow the printer 4 to self color calibrate. The PCS of a printer 4 can include an optical density of four single separation solid (e.g., full ink coverage) colors (cyan, magenta, yellow and black) and a LUT for each of the four single separation colors. If the PCS of the printer 4 is provided to the printer 4, the printer 4 can re-color calibrate itself by adjusting an optical density of the four single separation solid colors to an original (e.g., nominal) value and by adding an updated $LUT_j$ to the machine $LUT_j$, $j \in \{c,m,y,k\}$ 20 (e.g., new machine $LUT_j$=machine $LUT_j$, $j \in \{c,m,y,k\}$).

The memory 14 can include a print controller 22 for communicating and controlling the printer 4. In one example, the print controller 22 can format a document 24 for printing to execute a print job. The document 24 can be provided, for example, from an external system, such as a database and/or another computer. The print job can include, for example, printing multiple copies of the document 24. The print controller 22 can employ the machine $LUT_j$, $j \in \{c,m,y,k\}$ 20 to command the printer 4 to print ink 10 onto a substrate 6 at the printer 4. Over time, if and when the PCS changes, material (e.g., pictures) printed on the substrate 6 would change appearance unless the printer 4 is re-color calibrated. The change in appearance could occur, for example, due to temperature changes, changes in the printer 4, changes in the ink 10, etc. To provide the PCS parameters to color calibrate the printer 4, the memory 14 can include a PCS estimator 26 that can generate an optical density ($OD_j$) 27, $j \in \{c,m,y,k\}$ 27 for each of the four single separation solid colors and an updated $LUT_j$, $j \in \{c,m,y,k\}$ 28. The updated $LUT_j$, $j \in \{c,m,y,k\}$ 28 can include an updated $LUT_c$, an updated $LUT_m$, an updated $LUT_y$ and an updated $LUT_k$ corresponding to updated cyan, magenta, yellow and black single separation lookup tables.

To generate the updated $LUT_j$, $j \in \{c,m,y,k\}$ 28 the PCS estimator 26 can calculate a set of parameters that allow press self calibration, which set of parameters can include the optical density of single separation solids. To calculate the optical density, the PCS estimator 26 can receive color measurements from a scanner 30.

The scanner 30 can be implemented as an in-line scanner (e.g., a rotary scanner) that scans the substrate 6 after the printer 4 has printed material on the substrate 6. The scanner 30 can be set to operate in no color pipeline mode (e.g., disable scanner imaging pipeline) to provide a relatively linear scanner color drift. In a scanner with a relatively linear color drift, color measurements of the same image for red, blue and green provided from the scanner 30 taken at two different times $T_1$ and $T_2$ can be nearly linearly proportional to each other. The linear color drift of the scanner can be eliminated, for example, by calibrating the scanner 30 with a white section of the substrate 6.

The optical density (OD) defines an inner product of a measured spectrum and one of three fixed profiles, such as a red, blue or green profile. Upon calculation of the $OD_j$ j∈{c,m,y,k} 27 for each of the four single separation solid colors, a dot area (DA) can be calculated. Calculation of the dot area allows for a straightforward calculation of the updated $LUT_j$, j∈{c,m,y,k} 28. The $OD_j$ j∈{c,m,y,k} 27 for each of the four single separation solid colors and the updated $LUT_j$, j∈{c,m,y,k} 28 can be employed by the print controller 22 to command the printer 4 to self color calibrate such that the print job can continue to execute. In this manner, providing the $OD_j$ j∈{c,m,y,k} 27 for each of the four single separation solid colors and the updated $LUT_j$, j∈{c,m,y,k} 28 during a print job allows for continuous color calibration (CCC) of the printer 4.

In one example, to calculate the optical density, the PCS estimator 26 can cause the print controller 22 to command the printer 4 to print four sets of test patches each with a single separation color (cyan, magenta, yellow and black). In some examples, there can be 15 test patches for each single separation color. The test patches can be printed in a designated and selectable area on the substrate 6, which area can be referred to as a patch area. The patch area for each patch can be about 7 mm×7 mm (or some other size) and can be positioned anywhere on the substrate 6. In one example, a first test patch in a set of test patches could have 0% of a coverage of ink 10 (e.g., white) of the of the single separation color in the patch area, while the fifteenth patch in the set of test patches can have 100% of coverage of ink 10 of the single separation color in the patch area. Moreover, test patches 2-14 in the set of test patches can have some predefined fraction of 100% of the coverage of ink 10 on the color space. In this manner, there can be a set of 15 test patches for each of the single separation colors, namely, cyan, magenta, yellow and black. Accordingly, in the present example, there can be a total of 60 test patches.

The scanner 30 can scan each of the test patches and provide color measurements for each of the test patches to the PCS estimator 26. As described herein, in some examples, color measurements of specific patches (e.g., patches with Neugebauer primary colors) can be employed as a reference point to compare color measures of the test patches, which patches can be referred to as reference patches. In some examples, the reference patches can be scanned by the scanner 30 prior to the execution of the print job. The PCS estimator 26 can employ the color measurements of each set of test patches for a given single separation color (cyan, magenta, yellow or black) to determine a conversion coefficient for each of the four single separation colors. The conversion coefficient can be calculated, for example, with equations derived from the Yule-Nielsen print model. The conversion coefficient for each of the four single separation colors can be employed by the PCS estimator 26 along with equations derived from the Yule-Nielsen print model, to determine a spectral reflectance for each of the four single separation colors. This spectral reflectance of each of the four single separation colors can be employed by the PCS estimator 26 to determine the $OD_j$ j∈{c,m,y,k} 27. The $OD_j$ j∈{c,m,y,k} 27 can be employed by the PCS estimator 26 to determine a dot area conversion factor for each of the four single separation colors. The dot area conversion factor for each of the four single separation colors can be employed by the PCS estimator 26 to provide the updated $LUT_c$, an updated $LUT_m$, an updated $LUT_y$ and an updated $LUT_k$, which together can be implemented as the updated $LUT_j$, j∈{c,m,y,k}. The $OD_j$ j∈{c,m,y,k} 27 for each of the four single separation solid colors and the updated $LUT_j$, j∈{c,m,y,k} 28 can be stored by the PCS estimator 26 in the color profile 18. By employing this technique, the test patches can be printed anywhere on the substrate 6 in contrast to test patches measured by a densitometer, such that the test patches can be removed (e.g. cut from) the substrate 6 in the most convenient manner. Moreover, the size of the test patch is based on the accuracy of the scanner 30. In this manner, test patches smaller than those employed for a densitometer would be possible.

In some examples, test patches are not needed. For instance, in some examples, printed material can have multiple sections (e.g., about 7 mm×7 mm) of a page that each has a relatively flat color, which indicates that the same (or nearly the same) color is printed throughout a given section. Each of the multiple sections can have a different color. In some examples, there can be about 100 or more the multiple sections. In these examples, the same section can be scanned by the scanner 30 on multiple copies of the same material (e.g. the same image). In many cases, the printer 4 will print hundreds (or thousands) of copies of the document 24 (e.g., book or magazine printing) throughout execution of the print job. In this situation, the same section will be printed at least once every time a copy of the document 24 is printed onto the substrate 6. In such a situation, it is presumed that during the printing of the first copy of the document 24, that the printer 4 is color calibrated. The scanner 30 can provide color measurements to the PCS estimator 26 for the every time (or subset thereof) the same section of the document 24 is printed. The PCS estimator 26 can calculate a deviation between an original press color state based on color measurements for the first copy of the document 24 and a current color state for a subsequent copy of the document 24 based on color measurements of the subsequent copy of the document 24.

The PCS estimator 26 can employ linear algebra and pseudo-inverse techniques to determine color deviation for each of the four single separation colors (cyan, magenta, yellow and black). The machine $LUT_j$, j∈{c,m,y,k} 20 and the color deviation of each of the four single separation colors can be employed to calculate updated $LUT_c$, the updated $LUT_m$, the updated $LUT_y$ and the updated $LUT_k$, which together can be implemented as the updated $LUT_j$, j∈{c,m,y,k} 28. The color deviation for solid colors of each of the four single separation colors can also be employed to calculate a drift in solids (100% coverage) for each of the four single separation colors. The drift in solids for each of the four single separation colors can be employed in equations derived from the Neugebauer print model to calculate a spectral reflectance for each of the four single separation colors. Calculation of the spectral reflectance for each of the four single separation colors allows the PCS estimator 26 to calculate an optical density drift for each of the four single separation solid colors. Calculation of the optical density drift for each of the four single separation colors allows the PCS estimator 26 to calculate the optical density $OD_j$ j∈{c,m,y,k} 27 for each of the four single separation solid colors. The $OD_j$ j∈{c,m,y,k} 27 for each of the four single separation solid colors and the updated $LUT_j$, j∈{c,m,y,k} 28 can be stored by the PCS estimator 26 in the color profile 18. Employment of this technique allows for a relatively high accuracy of estimation of printing changes, thereby ensuring that the printer 4 stays color calibrated.

Figure 2:
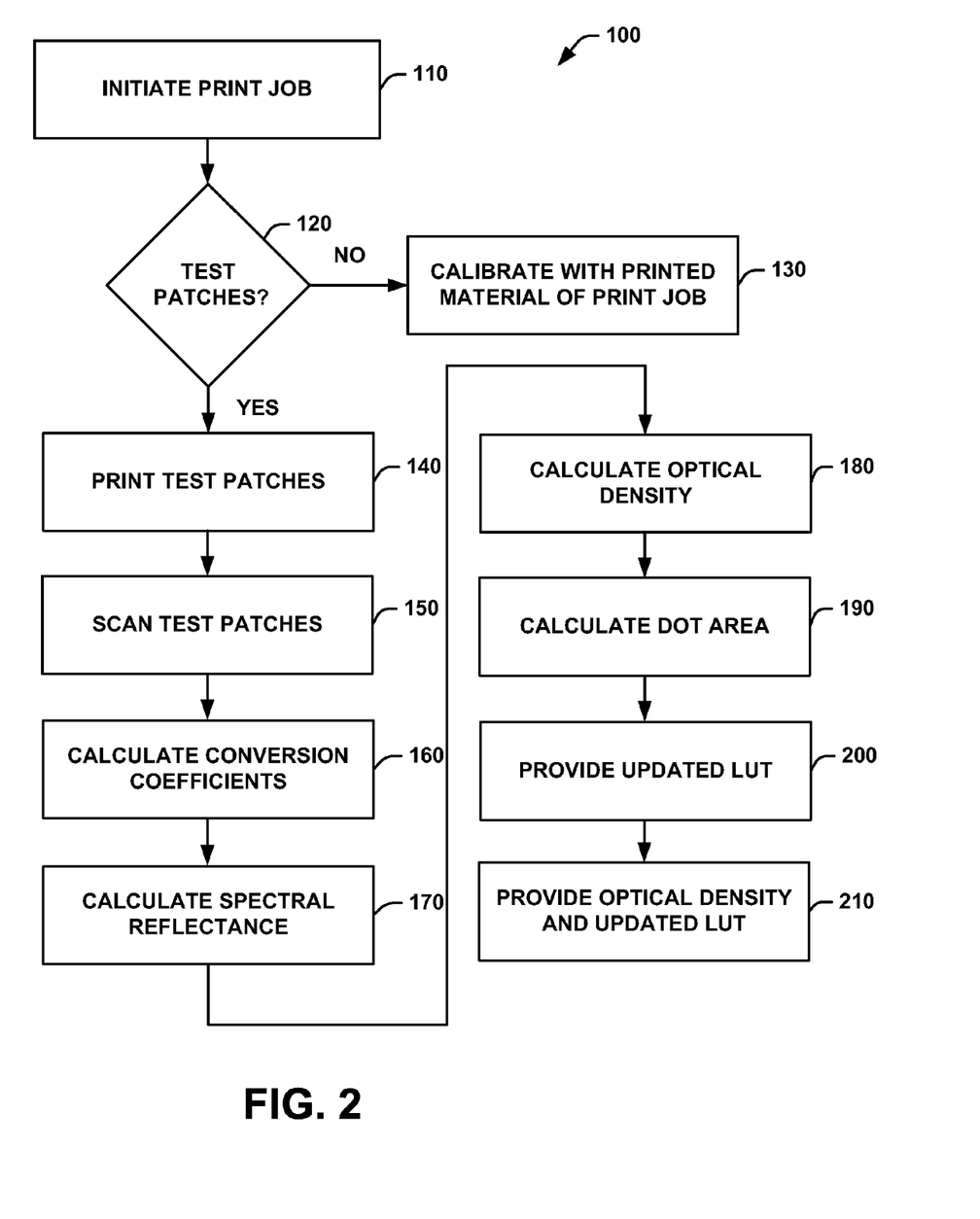
FIG. 2 illustrates an example of a flow chart for an example method for facilitating color calibration of a printer.
Figure 4:
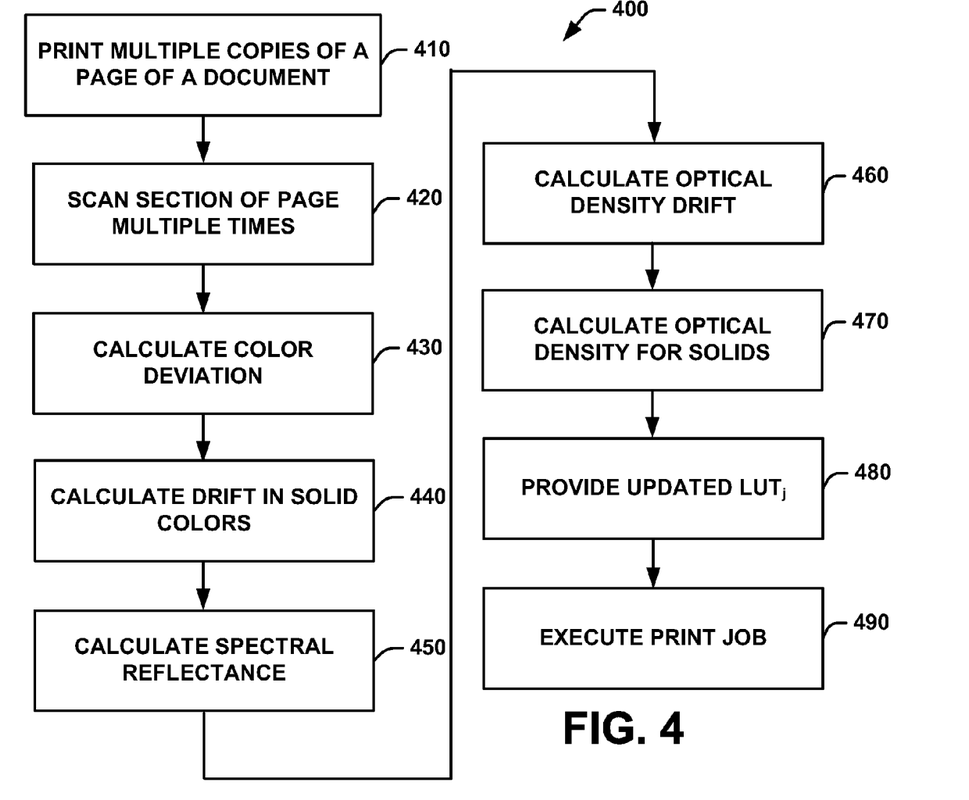
FIG. 4 illustrates another example of a flow chart for an example method for facilitating color calibration of a printer.
Figure 7:
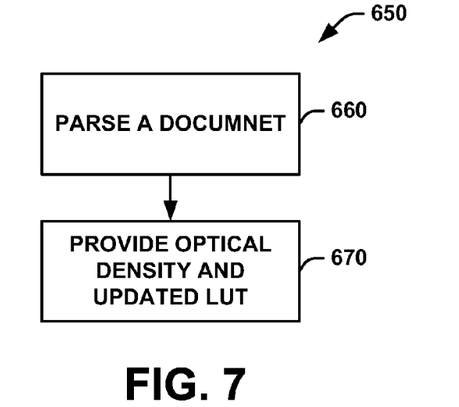
FIG. 7 illustrates yet another example of a flow chart for an example method for facilitating color calibration of a printer.

In view of the foregoing structural and functional features described above, example methods will be better appreciated with reference to FIGS. 2, 4 and 7. While, for purposes of simplicity of explanation, the example methods of FIGS. 2, 4 and 7 are shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 2 illustrates an example of a flowchart of an example method 100 for facilitating color calibration of a printer, such as the printer illustrated in FIG. 1. The method 100 could be implemented, for example, by the printer controller, such as the printer controller illustrated in FIG. 1.

At 110, a print controller of the printer controller can initiate a print job. The print job could be a request to print a document, such as the document illustrated in FIG. 1. At 120, a determination can be made as to whether test patches are needed to color calibrate the printer. The determination can be made by a PCS estimator of the printer controller. In one example, the PCS estimator can parse one or more pages of the document to determine as to whether multiple (e.g., about 100) sections (an area of about 7 mm×7 mm) of a given page within the document contains a relatively flat color, such that the color throughout the section is relatively constant. If the determination is negative (e.g., NO), the method 100 can proceed to 130. If the determination is positive (e.g., YES), the method 100 can proceed to 140. At 130, the printer can be calibrated with material of in the document in a manner described herein.

At 140, the PCS estimator can command the print controller to cause the printer to print test patches for the print job. The test patches can be comprised of a set of 15 test patches for each of four single separation colors, namely cyan (c), magenta (m), yellow (y) and black (k). Each test patch can be printed in a patch area on a substrate. The patch area can be anywhere on a page printed by the printer. Within a given set of test patches, the amount of ink can vary from 0% (e.g., white) to 100% (full coverage of the patch area). In this manner, 60 test patches can be printed, wherein a set of 15 test patches are printed for each of the four single separation colors, cyan (c), magenta (m), yellow (y) and black (k). In other examples, more or less than 15 test patches could be printed in each set.

At 150, the test patches can be scanned by an in-line scanner integrated with the printer. Color measurements (e.g., patch measurement data) of the scanned test patches can be provided to the PCS estimator from the scanner. At 160, the PCS estimator can employ the Yule-Nielsen print model to calculate conversion coefficients for cyan (c), magenta (m), yellow (y) and black (k). To calculate the conversion coefficients for cyan, $a_c$, magenta ($a_m$), yellow ($a_y$) and black ($a_k$) the PCS estimator can employ Equations 1-3 to solve for $a_j$, j∈{c,m,y,k}, for each patch k wherein Equations 1-3 can be derived from the Yule-Nielsen print model. It is noted that throughout the present examples, the notation ".{operator}" denotes element-wise operation, such that the operation is performed separately on each wavelength. It is also noted that throughout the present examples, the notation "white" indicates at or near 0% coverage of a color, while the notation "solid" indicates at or near 100% coverage of a color.

$$m_i(k) = P_i \left( a_{kj} R_{solid_j}^{\frac{1}{2}} + (1 - a_{kj}) R_{white_j}^{\frac{1}{2}} \right)^2, \quad \text{Equation 1}$$

$$j \in \{c, m, y, k\};$$

$$m_i(k) = a_{kj}^2 P_i R_{solid_j} + (1 - a_{kj})^2 P_i R_{white_j} + \quad \text{Equation 2}$$
$$2 a_{kj}(1 - a_{kj}) P_i (R_{white_j} \ast R_{solid_j})^{\frac{1}{2}},$$

$$j \in \{c, m, y, k\};$$

$$P_{ij}(R_{white_j} \ast R_{solid_j})^{\frac{1}{2}} = \quad \text{Equation 3}$$
$$2 m_i(50\%) - \frac{m_i(solid_j)}{2} - \frac{m_i(white_j)}{2},$$

$$j \in \{c, m, y, k\};$$

where:
k is a patch number in the set of 15 test patches for a given single separation color j (cyan, magenta, yellow or black), wherein the value of $a_{kj}$ corresponds to a percentage of coverage of the given single separation color j (cyan, magenta, yellow or black) within the patch area;
$m_i(x)$ is the color measurement provided by the scanner corresponding to a specific percentage (x) of a given single separation color j (cyan, magenta, yellow or black) ink in the patch area;
$P_i R_{white_j}$ is the color measurement of the scanner for white test patch (e.g., 0% coverage of the patch area in the given single separation color j ink) in the set of 15 test patches for each of single separation color j;
$P_i R_{solid_j}$ is the color measurement of the scanner for the final (fifteenth) test patch of the given single separation color j (cyan, magenta, yellow or black) (e.g., 100% coverage of the patch area in the given single separation color j ink) in the set of 15 test patches for single separation color j; and
$a_{kj}$ is the conversion coefficient for patch k of the given single separation color j (cyan, magenta, yellow or black) and has a value within the interval [0,1];

At 170, the PCS estimator can employ the Yule-Nielsen print model to calculate a spectral reflectance ($S_j$, j∈{c,m,y,k}) for each of cyan ($S_c$), magenta ($S_m$), yellow ($S_y$) and black ($S_k$). In one example, the PCS estimator can employ Equation 4 (e.g., a Yule-Nielsen print model equation) to calculate the spectral reflectance for each given ($S_j$ j∈{c,m,y,k}).

$$S_j = \left( a_j R_{solid_j}^{\frac{1}{n}} + (1 - a_j) R_{white_j}^{\frac{1}{n}} \right)^n, \quad \text{Equation 4}$$

$$j \in \{c, m, y, k\};$$

where:
n is an empirically determined integer in the Yule-Nielsen print model equation, wherein model accuracy increases as n increases, and for purposes of simplification of explanation it will be presumed that n=2;
$R_{white_j}$ is a predetermined measured spectral reflectance stored in a color profile of the printer controller corresponding to the test patch of white;
$R_{solid_j}$ is a predetermined measured spectral reflectance stored in the color profile corresponding to the test patch of the given single separation color j (cyan, magenta, yellow or black) for solid coverage (100%); and $S_j$ is the calculated spectral reflectance for each given single separation color j (cyan, magenta, yellow or black).

At 180, the optical density for each patch p of cyan ($OD_c$), magenta ($OD_m$), yellow ($OD_y$) and black ($OD_k$) can be calculated by the PCS estimator. In one example, the PCS estimator can employ Equation 5 to calculate the optical density of cyan ($OD_j$ j∈{c,m,y,k}).

$$OD_j(p) = P_{statusT} S_j, j \in \{c,m,y,k\};\qquad \text{Equation 5:}$$

where:

$P_{statusT}$ is a status T profile of one of three fixed profiles; and $OD_j(p)$ is the optical density for a test patch of a given single separation color j (cyan, magenta, yellow or black) with a percentage of coverage p of the given single separation color j.

Figure 3:
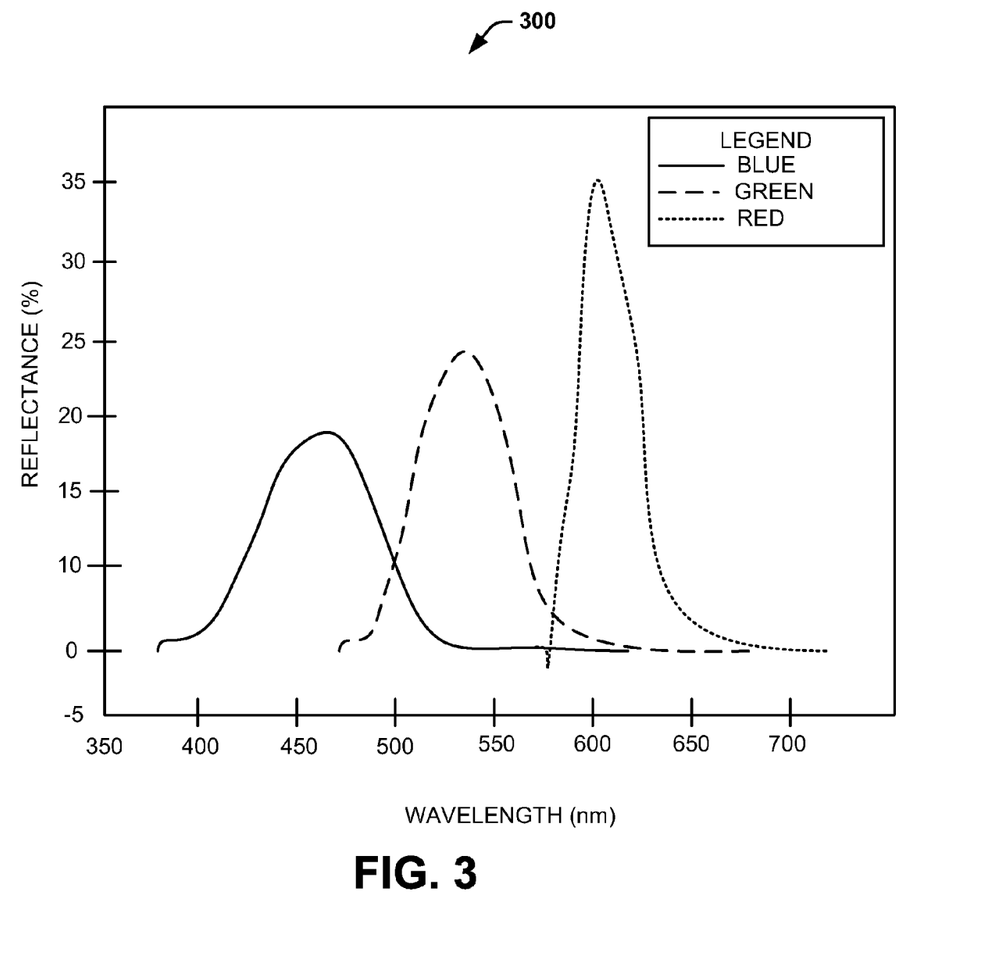
FIG. 3 illustrates a graph of an example of a color profile.

FIG. 3 illustrates a graph 300 depicting a status profile, $P_{statusT}$ for each of red, green and blue (RGB) profiles. In FIG. 3, reflectance in percentage (%) of a color is plotted as a function of wavelength, in nanometers (nm). Referring back to FIG. 2, to calculate $OD_c$, the status T profile for red can be employed. To calculate $OD_m$, the status T profile for green can be employed. Additionally, to calculate $OD_y$, the status T profile for blue can be employed. Yet further, to calculate $OD_k$, a combination of the status T profiles of red, green and blue can be employed.

At 190, the PCS estimator can calculate the dot area for each of cyan ($DA_C$), magenta ($DA_m$), yellow ($DA_y$) and black ($DA_k$). In one example, the PCS estimator can employ Equation 6 to calculate the dot area for each single separation color ($DA_A$, j∈{c,m,y,k}).

$$DA_j(p) = \frac{10^{-OD_j(p)} - 10^{-OD_j(white)}}{10^{-OD_j(solid)} - 10^{-OD_j(white)}}, \qquad \text{Equation 6}$$

$$j \in \{c, m, y, k\}$$

where:

$DA_j(p)$ is the dot area of a given single separation color j (cyan, magenta, yellow or black) for a specific percentage of coverage, p of the given single separation color j within a patch area;

$DA_j(white) = 0$; and $DA_j(solid) = 1$.

At 200, the PCS estimator can provide an updated $LUT_j$, j∈{c,m,y,k}. The updated $LUT_j$ can include an updated LUT for cyan ($LUT_c$), magenta ($LUT_m$), yellow ($LUT_y$), and black ($LUT_k$). In one example, the updated $LUT_j$, j∈{c,m,y,k} can be calculated by the PCS estimator by employing Equation 7.

$$LUT_j = [DA_j(\text{white}), DA_j(7\%), DA_j(15\%), DA_j(23\%) \ldots DA_j(\text{solid})], j \in \{c, m, y, k\} \qquad \text{Equation 7:}$$

At 210, the print controller can provide the $OD_j$ j∈{c,m,y,k} for each single solid separation color and the updated $LUT_j$ j∈{c,m,y,k} (e.g., a PCS of the printer) to the printer to facilitate color calibration of the printer. By employing this technique, the test patches can be printed anywhere on a page. Moreover, the size of the test patches can be based on the functionality of the scanner. Further, the test patches can be printed continuously, such that the printer is continuously calibrated thereby ameliorating the need to stop the print job to color calibrate the printer.

FIG. 4 illustrates an example of a flowchart of an example method 400 for facilitating color calibration of a printer, such as the printer illustrated in FIG. 1. The method 400 could be implemented, for example, by a printer controller, such as the printer controller illustrated in FIG. 1. The method 400 could be employed to implement the action 130 illustrated in FIG. 2. In such a situation, as noted with respect to the method 100 of FIG. 2, a PCS estimator of the printer controller can identify multiple (e.g., about 100) sections of a document page with a relatively flat color, such that the color is relatively constant throughout the section. In one example, each section can be implemented, for example, as about 7 mm×7 mm section. In other examples, different sizes could be employed.

At 410, multiple copies of the page of a document that includes the multiple sections can be printed for a print job. For instance, the print job may consist of hundreds or thousands of copies of the document (e.g., book or magazine printing). In such a situation, the same pages of the document would be printed every time a copy of the document was printed. At 420, the multiple sections of the page of the document can be scanned by a scanner each time (or some portion thereof) the page that includes the multiple sections is printed. The scanner can be implemented as an in-line scanner that can be integrated with the printer, such as described with respect to FIG. 1. Color measurements of each section (e.g., section measurement data) can be provided to the PCS estimator from the scanner. For purposes of simplicity of explanation, the method 420 is described with respect to a single section of the multiple sections of a page. However, it is to be understood that the actions in the method 400 can apply to each of the multiple sections.

At 430, a deviation in color can be calculated by the PCS estimator for cyan (c), magenta (m), yellow (y) and black (k). The deviation in color can represent a color drift detected between a first scanned section and a subsequently scanned section. The deviation in color $\Delta_{a_i}^T$, i∈{1, 2, 3} can be calculated by the PCS estimator with Equations 9-16:

$$m_i(a_c^T, a_m^T, a_y^T, a_k^T) = m_i(a_c^0, a_m^0, a_y^0, a_k^0) + M_\Lambda \frac{\partial v(a_c, a_m, a_y, a_k)}{\partial a_c} \Delta_{a_c}^T + M_\Lambda \frac{\partial v(a_c, a_m, a_y, a_k)}{\partial a_m} \Delta_{a_m}^T + M_\Lambda \frac{\partial v(a_c, a_m, a_y, a_k)}{\partial a_y} \Delta_{a_y}^T + M_\Lambda \frac{\partial v(a_c, a_m, a_y, a_k)}{\partial a_k} \Delta_{a_k}^T, \qquad \text{Equation 9}$$

$$i \in \{1, 2, 3\};$$

$$M_\Lambda = P_i * R_\Lambda, \qquad \text{Equation 10}$$

$$i \in \{1, 2, 3\};$$

$$\frac{\partial v(a_c, a_m, a_y, a_k)}{\partial a_j} = B * \frac{\partial d(a_c, a_m, a_y, a_k)}{\partial a_j}, \qquad \text{Equation 11}$$

$$j \in \{c, m, y, k\};$$

-continued $$d(a_c, a_m, a_y, a_k) = \begin{bmatrix} 1, a_c, a_m, a_y, a_k, a_ca_m, a_ca_y, a_ca_k, a_ma_y, \\ a_ma_k, a_ya_k, a_ca_ma_y, a_ca_ya_k, \\ a_ca_ma_k, a_ma_ya_k, a_ca_ma_ya_k \end{bmatrix}^{TRANSPOSE} ;$$

Equation 12

$$B = \begin{bmatrix} 1 & -1 & -1 & -1 & -1 & 1 & 1 & 1 & 1 & 1 & 1 & -1 & -1 & -1 & -1 & 1 \\ 0 & 1 & 0 & 0 & 0 & -1 & -1 & -1 & 0 & 0 & 0 & 1 & 1 & 1 & 0 & -1 \\ 0 & 0 & 1 & 0 & 0 & -1 & 0 & 0 & -1 & -1 & 0 & 1 & 0 & 1 & 1 & -1 \\ 0 & 0 & 0 & 1 & 0 & 0 & -1 & 0 & -1 & 0 & -1 & 1 & 1 & 0 & 1 & -1 \\ 0 & 0 & 0 & 0 & 1 & 0 & 0 & -1 & 0 & -1 & -1 & 0 & 1 & 1 & 1 & -1 \\ 0 & 0 & 0 & 0 & 0 & 1 & 0 & 0 & 0 & 0 & 0 & -1 & 0 & -1 & 0 & 1 \\ 0 & 0 & 0 & 0 & 0 & 0 & 1 & 0 & 0 & 0 & 0 & -1 & -1 & 0 & 0 & 1 \\ 0 & 0 & 0 & 0 & 0 & 0 & 0 & 1 & 0 & 0 & 0 & 0 & -1 & -1 & 0 & 1 \\ 0 & 0 & 0 & 0 & 0 & 0 & 0 & 0 & 1 & 0 & 0 & 0 & 0 & 0 & -1 & 1 \\ 0 & 0 & 0 & 0 & 0 & 0 & 0 & 0 & 0 & 1 & 0 & -1 & 0 & -1 & -1 & 1 \\ 0 & 0 & 0 & 0 & 0 & 0 & 0 & 0 & 0 & 0 & 1 & 0 & -1 & 0 & -1 & 1 \\ 0 & 0 & 0 & 0 & 0 & 0 & 0 & 0 & 0 & 0 & 0 & 1 & 0 & 0 & 0 & -1 \\ 0 & 0 & 0 & 0 & 0 & 0 & 0 & 0 & 0 & 0 & 0 & 0 & 1 & 0 & 0 & -1 \\ 0 & 0 & 0 & 0 & 0 & 0 & 0 & 0 & 0 & 0 & 0 & 0 & 0 & 1 & 0 & -1 \\ 0 & 0 & 0 & 0 & 0 & 0 & 0 & 0 & 0 & 0 & 0 & 0 & 0 & 0 & 1 & -1 \\ 0 & 0 & 0 & 0 & 0 & 0 & 0 & 0 & 0 & 0 & 0 & 0 & 0 & 0 & 0 & 1 \end{bmatrix}$$

Equation 13

$$R_\Lambda = [r_w \mid r_c \mid r_m \mid r_y \mid r_k \mid r_{cm} \mid r_{cy} \mid r_{c_k} \mid r_{my} \mid r_{yk} \mid r_{cmy} \mid r_{cyk} \mid r_{cmk} \mid r_{myk} \mid r_{cmyk}];$$

Equation 14 where:
- $d(a_c, a_m, a_y, a_k)$ is a linear function vector with parameters $a_c$, $a_m$, $a_y$ and $a_k$ with value of percentages of ink coverage for cyan, magenta, yellow and black, respectively in the section, and $d(a_c, a_m, a_y, a_k)$ is defined by Equation 12;
- B is a 16×16 matrix defined in Equation 13;
- $R_\Lambda$ is a sixteen column matrix defined by Equation 14 with columns that are the spectra (r) of the 0% and 100% combinations of ink coverages for white (w), cyan (c), magenta (m), yellow (y) and black (k);
- $M_\Lambda$ is a matrix defined by Equation 10 with columns that are scanned color measurements of cellular Neugebauer print model primary colors;
- $(a_c^0, a_m^0, a_y^0, a_k^0)$ is the coverage (in percentage) of cyan (c), magenta (m), yellow (y) and black (k) in the first scanned section;
- $(a_c^T, a_m^T, a_y^T, a_k^T)$ is the coverage (in percentage) of cyan (c), magenta (m), yellow (y) and black (k) in the subsequently scanned section, scanned at time T;
- $m_i(a_c^0, a_m^0, a_y^0, a_k^0)$ is the color measurement provided to the PCS estimator for the first scanned section;
- $m_i(a_c^T, a_m^T, a_y^T, a_k^T)$ is the color measurement provided to the PCS estimator for the subsequently scanned section, scanned at time T; and
- $\Delta_{a_i}^T, j \in \{c,m,y,k\}$ is deviation in color that defines the effect on a corresponding updated $LUT_j$ evolved during time T given coverage percentage $a_j$.

By employing Equations 10-14, the PCS estimator can reduce the unknown variables to $\Delta_{a_i}^T, j \in \{c,m,y,k\}$. Moreover, there are four Taylor series difference polynomials that can describe differences between the four $LUT_j$ ($LUT_c$, $LUT_m$, $LUT_y$, and $LUT_k$) at a time of the first scanned section and time T. The PCS estimator can employ Equation 15 to characterize an unknown difference polynomial.

$$\Delta_{a_i}^T \approx f_j(a_j) = \sum_{k=1}^{K} p_j(k)(a_j)^k, j \in \{c,m,y,k\};$$

Equation 15:

where:
K is an integer found empirically and can be set equal to 3. By integrating Equation 15 into Equation 9, the PCS estimator can derive Equation 16.

$$m_i(a_c^T, a_m^T, a_y^T, a_k^T) = m_i(a_c^0, a_m^0, a_y^0, a_k^0) + \sum_{h=1}^{4} M_\Lambda B \frac{\partial d(a_c, a_m, a_y, a_k)}{\partial a_j} \sum_{k=1}^{K} p_j(k)(a_j)^k,$$

$i \in \{1, 2, 3\},$ $j \in \{c, m, y, k\};$

Equation 16 where:
$p_j(k)$, $j \in \{c,m,y,k\}$ is the drift coefficient for each of cyan (c), magenta (m), yellow (y) and black (k).

The expansion of Equation 16 results in 3*N equations with 4*K unknowns, namely, $p_j(k)$, $j \in \{c,m,y,k\}$ where N is an integer equal to a total number of sections scanned by the scanner. Thus, if K=3 and if at least four (4) sections are scanned, the drift coefficients can be calculated. Moreover, by substituting $p_j(k)$, $j \in \{c,m,y,k\}$ into Equation 15, the color deviation $\Delta_{a_i}^T$ for each of cyan (c), magenta (m), yellow (y) and black (k) can be calculated.

At 440, the PCS estimator can employ the color deviation to calculate drift in solid colors, namely solid cyan, solid magenta, solid yellow and solid black. To calculate the drift in each solid color, it can be presumed that the document contains mixtures of 100% coverage of one color and an arbitrary coverage of the other three colors. In one example, there can be presumed to be 100% coverage of cyan ($a_c$), 20% coverage of magenta ($a_m$), 40% coverage of yellow, ($a_y$) and 30% coverage of black ($a_k$), such that $(a_c,a_m,a_y,a_k)=(100, 20, 40, 30)$, such that $\Delta_{a_i}^T$, $j \in \{c,m,y,k,\}$ can be calculated for 100% coverage, which corresponds to the drift in solid colors.

At 450, by employing the estimation for the drift in solid colors, the spectral reflectance, $S_j$, $j \in \{c,m,y,k,\}$ can be calculated by the PCS estimator for each of cyan, magenta, yellow and black. To calculate the spectral reflectance, $S_j$, $j \in \{c,m,y, k,\}$, the PCS estimator can employ Equations 17 and 18.

$$S_j = (aR_{solid_j} + (1-a)R_{white_j}), a \geq 0, j \in \{c,m,y,k\};$$

Equation 17:

$$a = 1 + \Delta_{a_i}^T, j \in \{c,m,y,k\};$$

Equation 18:

where:

$R_{white_j}$ is a predetermined measured spectral reflectance stored in the color profile corresponding to the section for a given single separation color j (cyan, magenta, yellow or black) with white (e.g., about 0%) coverage of the given single separation color j;

$R_{solid_j}$ is a predetermined measured spectral reflectance stored in the color profile corresponding to the section for the given single separation color j (cyan, magenta, yellow or black) with solid (e.g., about 100) coverage of the given single separation color j;

At 460 the PCS estimator can calculate an optical density drift for each of cyan, magenta, yellow and black. To calculate the optical density drift, $ODD_j$, $j \in \{c,m,y,k,\}$, for each single separation color, the PCS estimator can employ Equations 19-21.

$$OD_j(p) = P_{statusT} S_j, j \in \{c,m,y,k\}; \quad \text{Equation 19:}$$

$$ODD_j = OD^T(\text{solid}_j) - OD^0(\text{solid}_j), j \in \{c,m,y,k\}; \quad \text{Equation 20:}$$

$$ODD_j = \Delta_{a_j}{}^T * P_{statusT}(R_{solid_j} - R_{white_j}); \quad \text{Equation 21:}$$

where:

$P_{statusT}$ is the color profile illustrated in FIG. 3 for at least one of red, green and blue;

$OD^0(\text{solid}_j)$ is the optical density of a given single separation solid color j, (cyan, magenta, yellow or black) of the first scanned section;

$OD^T(\text{solid}_j)$ is the optical density of a given single separation solid color j (cyan, magenta, yellow or black) of the subsequently scanned section, scanned at time T;

$R_{solid_j}$ is a predetermined spectral reflectance for the given single separation color j (cyan, magenta, yellow or black) at a solid coverage (e.g., at or near 100%) in the section; and $R_{white_j}$ is a predetermined spectral reflectance for the given single separation color j (cyan, magenta, yellow or black) at white coverage (e.g., at or near 0%) in the section.

At 470, the PCS estimator can calculate the optical density for each of the four single solid separation colors (cyan, magenta, yellow or black), $OD_j(\text{solid})$ $j \in \{c,m,y,k,\}$. Equation 22 can be employed by the PCS estimator to calculate the $OD_j(\text{solid})$.

$$OD_j(\text{solid}) = 1 + ODD_j, j \in \{c,m,y,k\}; \quad \text{Equation 22:}$$

At 480, the PCS estimator can provide an updated $LUT_j$, $j \in \{c,m,y,k,\}$. The updated $LUT_j$ can include an updated LUT for cyan ($LUT_c$), magenta ($LUT_m$), yellow ($LUT_y$), and black ($LUT_k$). In one example, the updated $LUT_j$, $j \in \{c,m,y,k,\}$ can be calculated by the PCS estimator by employing Equation 7. The updated $LUT_j$, $j \in \{c,m,y,k,\}$ can be calculated by adding the different polynomials to the dot areas of 15 single separation colors. For instance, in one example, Equation 23 can be employed to calculate the updated $LUT_j$, $j \in \{c,m,y,k\}$ $$\text{updated } LUT_j = [DA_j(\text{white}), \quad \text{Equation 23}$$
$$DA_j(7\%) + f_j(7\%), DA_j(15\%) + f_j(15\%),$$
$$DA_j(23\%) + f_j(23\%), \ldots, DA_j(\text{solid}) + f_j(100\%)],$$
$$j \in \{c, m, y, k\}$$

where:

$DA_j(x)$ is the dot area for a given color j (cyan, magenta, yellow or black) in the machine $LUT_j$.

At 490, a print controller of the printer controller can provide the $OD_j(\text{solid})$ and the updated $LUT_j$ $j \in \{c,m,y,k,\}$ (e.g., a PCS of the printer) to the printer to facilitate color calibration of the printer. By employing this technique, no test patches are needed. Further, the method 400 can be executed continuously, such that the printer is continuously color calibrated thereby ameliorating the need to stop the print job to color calibrate the printer.

Figure 5:
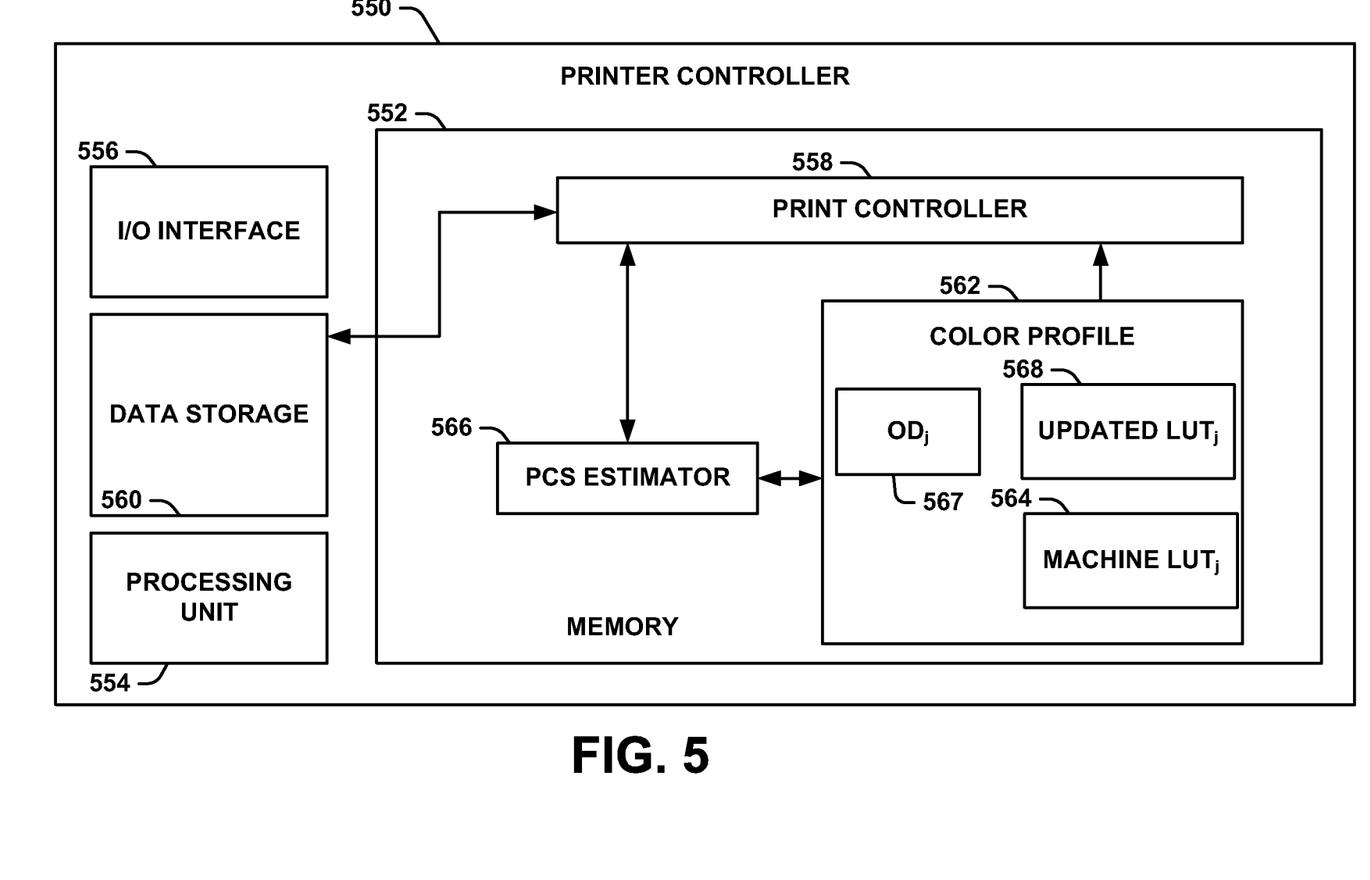
FIG. 5 illustrates an example of a printer controller for facilitating color calibration of a printer.

FIG. 5 illustrates an example of a printer controller 550 that could be employed as the printer controller 12 illustrated in FIG. 1. The printer controller 550 can include a memory 552 for storing machine readable instructions. The memory 552 could be implemented, for example, as random access memory (RAM), flash memory, a hard disk drive, etc. The printer controller 550 can also include a processing unit 554 for accessing the memory 552 and for executing the machine readable instructions stored in the memory 552. The processing unit 554 can be implemented, for example, as a processor core.

The printer controller 550 can include an I/O interface 556 for communicating with a printer and a scanner, such as the printer 4 and the scanner 30 illustrated in FIG. 1. In some examples, the printer controller 550 can be a system external to the printer. In such a situation, the I/O interface 556 can be implemented as a network or universal serial bus (USB) port. In other examples, the printer controller 550 can be implemented as a system integrated with the printer and/or the scanner. In such a situation, the I/O interface 556 can include a data bus for communicating with the printer and/or the scanner.

The memory 552 can include a print controller 558 that can manage a print job. In one example, the print controller 558 can initiate the print job by accessing and/or receiving a document from data storage 560. The print controller 558 can access a color profile 562 for the printer that includes a machine $LUT_j$, $j \in \{c,m,y,k,\}$ 564 to command the printer to execute the print job. The data storage 560 could be implemented, for example, as nonvolatile memory, such as flash memory, a hard disk, etc. To complete the print job, the print controller 558 can command the printer to print the document a predetermined number of times.

Upon initiation of the print job, a PCS estimator 566 can parse the document to determine if test patches are needed. Test patches can be needed if the PCS estimator 566 determines that no page of the document contains multiple sections (e.g., about 100) that are each large enough (e.g., about 7 mm×7 mm) and sufficiently flat in color throughout the each section.

If the PCS estimator 566 determines that test patches are needed, the PCS estimator 566 can command the print controller 558 to provide a set (e.g., 15) of test patches for each single separation color, namely cyan (c), magenta (m), yellow (y) and black (k) with the print job, as described herein. The PCS estimator 566 can receive scanned color measurements of each of the scanned test patches from an in-line scanner integrated with the printer. The scanner can be operating in no color pipeline mode (e.g., disable scanner imaging pipeline), such that the scanner's color drift is relatively linear. The PCS estimator 566 can employ Equations 1-3 (e.g, equations derived from the Yule-Nielson print model) to calculate a conversion coefficient $a_{k_j}$, $j \in \{c,m,y,k,\}$ for each single separation color j for each color patch k.

Upon calculation of the conversion coefficients $a_{jk}$, $j \in \{c,m,y,k,\}$, the PCS estimator 566 can employ Equation 4 (e.g, a Yule Nielson print model equation) to calculate a spectral reflectance, $S_j$, $j \in \{c,m,y,k,\}$ for each of the four single separation color patches. The PCS estimator 566 can employ the calculated spectral reflectance $S_j$ and Equation 5 to calculate an optical density, $OD_j$, j∈{c,m,y,k,} 567 for each of the four single separation color patches. Moreover, the PCS estimator 566 can employ the calculated optical density, $OD_j$, j∈{c,m,y,k,} 567 and Equation 6 to calculate a dot area $DA_j$, j∈{c,m,y,k,} for each of the four single separation color patches. Further, the PCS estimator 566 can employ the calculated $DA_j$, j∈{c,m,y,k,} and Equation 7 to provide an updated $LUT_j$ j∈{c,m,y,k,} 568. The PCS estimator 566 can store the updated $LUT_j$ 568 and the $OD_j$, j∈{c,m,y,k,} for each of the four single separation solid colors in the color profile 562.

If the PCS estimator 566 determines that test patches are not needed, the print controller 558 can print multiple copies of a page of the document that includes the aforementioned multiple sections with a relatively flat color. The PCS estimator 566 can employ Equations 9-16 to calculate a color deviation, $\Delta_{a_i}^T$, j∈{c,m,y,k} for each of the four single separation solid colors, cyan (c), magenta (m), yellow (y) and black (k). The PCS estimator 566 can employ the color deviation, $\Delta_{a_i}^T$, j∈{c,m,y,k} and Equation 23 to calculate the updated $LUT_j$ j∈{c,m,y,k}. The PCS estimator 566 can also employ the color deviation, $\Delta_{a_i}^T$, j∈{c,m,y,k} and Equations 17-18 (e.g., Neugebauer print model equations) to calculate the spectral reflectance $S_j$, j∈{c,m,y,k} for each of the four single separation solid colors. In turn, the PCS estimator 566 can employ Equation 19-21 to calculate us in the optical density drift, $ODD_j$, j∈{c,m,y,k} for each of the four single separation solid colors.

The PCS estimator 566 can employ the optical density drift $ODD_j$, j∈{c,m,y,k} and Equation 22 to calculate the optical density $OD_j$, j∈{c,m,y,k} for each of the four single separation solid colors. The PCS estimator 566 can store the optical density $OD_j$, j∈{c,m,y,k} 567 for each of the four single separation solid colors and the updated $LUT_j$, j∈{c,m,y,k} 568 in the color profile 562.

The print controller 558 can provide the optical density $OD_j$, j∈{c,m,y,k} 567 for each of the four single separation solid colors and the updated $LUT_j$, j∈{c,m,y,k} 568 (e.g., a PCS of the printer) to the printer to facilitate color calibration of the printer (e.g., self calibration). Accordingly, the scanned color measurements of data corresponding to material in the document being printed or test patches can be employed to continuously color calibrate the printer.

In some examples, every page of the print job is different, such that the same multiple sections of a page cannot be scanned. In such a situation, the PCS estimator 566 can calculate a difference in theoretical color measurements determined from the cellular Neugebauer print model and scanned color measurements. In such a situation, differences in the theoretical color measurements and the scanned color measurements can be calculated with Equation 24.

$$m_i(a_c,a_m,a_y,a_k)=M_\Lambda * v(a_c,a_m,a_y,a_k), i\in\{1,2,3\} \quad \text{Equation 24:}$$

where:
$M_\Lambda$ is defined by Equation 10;
$m_i(a_c,a_m,a_y,a_k)$ is the color measurement provided by the scanner;
$(a_c,a_m,a_y,a_k)$ is the coverage (in percent) of cyan (c), magenta (m), yellow (y) and black(k) in the scanned section; and
$v(a_c,a_m,a_y,a_k)$ is equal to B (defined in Equation 13) multiplied by $d(a_c,a_m,a_y,a_k)$ defined in Equation 12).

The PCS estimator 556 can employ the calculated difference between the theoretical color measurements and the scanned color measurements to determine the drift between current colors and original colors. The drift between colors could be employed, for example, to determine the updated $LUT_j$, j∈{c,m,y,k} 568 and the $OD_j$, j∈{c,m,y,k} 567 for each of the four single separation solid colors.

Figure 6:
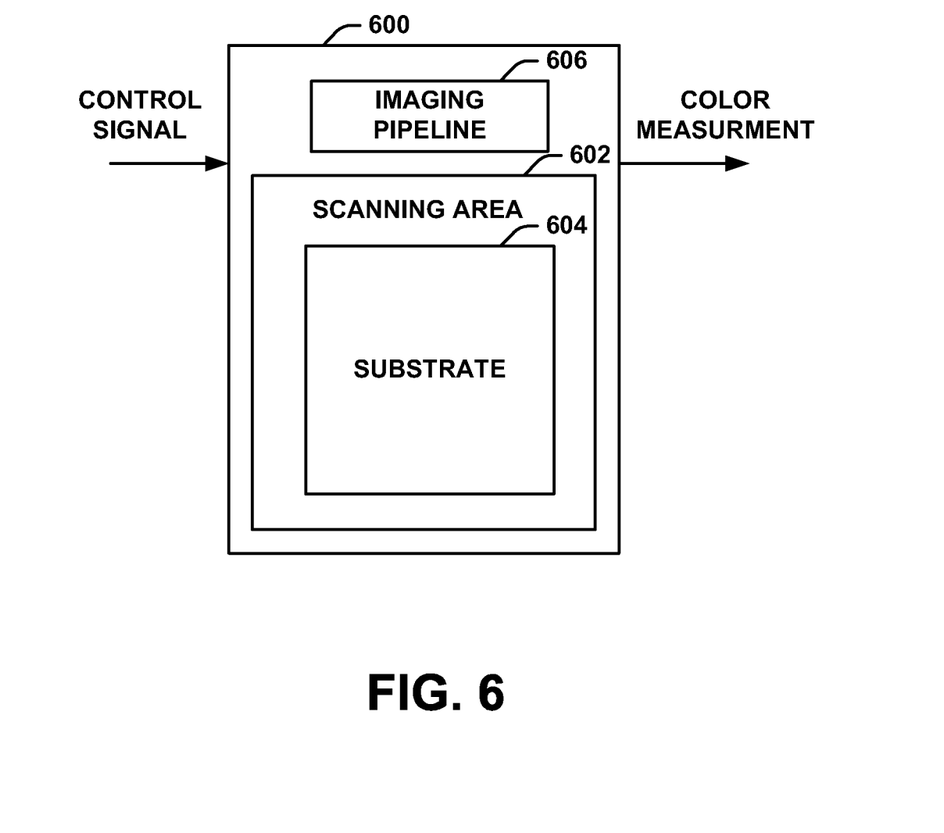
FIG. 6 illustrates an example of a scanner.

FIG. 6 illustrates an example of a scanner 600, such as the scanner 30 illustrated in FIG. 1. The scanner 600 can include a scanning area 602 that can scan a substrate 604. As explained, the scanner 600 can be implemented as an in-line scanner integrated with the printer, such as the printer 4 illustrated in FIG. 1. The scanner 600 can include an imaging pipeline. The scanner 600 can receive a control signal (labeled in FIG. 6 as "CONTROL SIGNAL") that can control operations of the scanner 600. In one example, the control signal can control when and where the substrate 604 is scanned. Moreover, the control signal can enable or disable the imaging pipeline. Upon scanning substrate 604 (or some portion thereof), the scanner 600 can output a color measurement signal (labeled in FIG. 6 as "COLOR MEASUREMENT") comprising of a red measurement (R), a green measurement (G) and a blue measurement (B) (e.g., light measurements).

Upon disabling the imaging pipeline 606, the scanner 600 can be operating in a mode referred to as "no color pipeline" mode. Moreover, in no color pipeline mode, the scanner 600 has a relatively linear scanner color drift over time. By providing a relatively linear scanner color drift, Equations 23-25 can characterize color measurements taken by the scanner 600 of patches/sections of substrates 604 with the same color at 2 different times, $T_1$ and $T_2$.

$$R_{T_2}=a_R R_{T_1}; \quad \text{Equation 23:}$$

$$G_{T_2}=a_G G_{T_1}; \quad \text{Equation 24:}$$

$$B_{T_2}=a_B B_{T_1}; \quad \text{Equation 25:}$$

where:
$a_R$, $a_G$ and $a_B$ are red (R), blue (B) and green (G) drift parameters of the scanner 600, respectively;
$R_{T_1}$, $G_{T_1}$, and $B_{T_1}$ are the (R), blue (B) and green (G) color measurements provided by the scanner 600, respectively of the patch/section of the substrate taken at time $T_1$; and
$R_{T_2}$, $G_{T_2}$, and $B_{T_2}$ are the (R), blue (B) and green (G) color measurements provided by the scanner 600, respectively of the patch/section of the substrate taken at time $T_2$.

To determine the drift parameters, $a_R$, $a_G$ and $a_B$ of the scanner 600, color measurements can be measured on a white area (e.g., 0% ink coverage) of the substrate at a given time T and compared to a reference measurement value. Equations 26-28 characterize equations for determining the drift parameters, $a_R$, $a_G$ and $a_B$.

$$a_R = \frac{R_{Ref}^{white}}{R_T^{white}}; \quad \text{Equation 26}$$

$$a_G = \frac{G_{Ref}^{white}}{G_T^{white}}; \quad \text{Equation 27}$$

$$a_B = \frac{B_{Ref}^{white}}{G_T^{white}}; \quad \text{Equation 28}$$

where:
$R_{Ref}^{white}$, $G_{Ref}^{white}$ and $B_{Ref}^{white}$ are the (R), blue (B) and green (G) reference color measurements for the scanner 600, respectively; and
$R_T^{white}$, $G_T^{white}$ and $G_T^{white}$ are the (R), blue (B) and green (G) color measurements provided by the scanner 600, respectively taken at time T.

In some examples, the scanner 600 can be configured/programmed to be self calibrating, thereby determining the drift parameters $a_R$, $a_G$ and $a_B$ automatically. In other examples, the drift parameters can be stored and calculated by a printer controller, such as the printer controller 12 illustrated in FIG. 1 and/or the printer controller 550 illustrated in FIG. 5. In such a situation, a PCS estimator and/or a print controller of the printer controller can calculate the drift parameters $a_R$, $a_G$ and $a_B$ of the scanner 600 and provide the drift parameters to the scanner 600 via the control signal. Calculation of the drift parameters allows the color drift of the scanner 600 to be accounted for in the color calibration of the printer.

FIG. 7 illustrates another flowchart of an example method 650 for facilitating color calibration of a printer. The method could be implemented, for example by the printer controller 12 illustrated in FIG. 1 and/or the printer controller 550 illustrated in FIG. 5. At 660, a document can be parsed (e.g., by a PCS estimator of the printer controller) to determine if test patches are needed to continuously color calibrate a printer. At 670 an optical density for each of four single separation solid colors and an updated LUT for each of four single separation colors can be provided (e.g., by the PCS estimator) to facilitate color calibration of the printer based on color measurements provided by an in-line scanner integrated with the printer.

Figure 8:
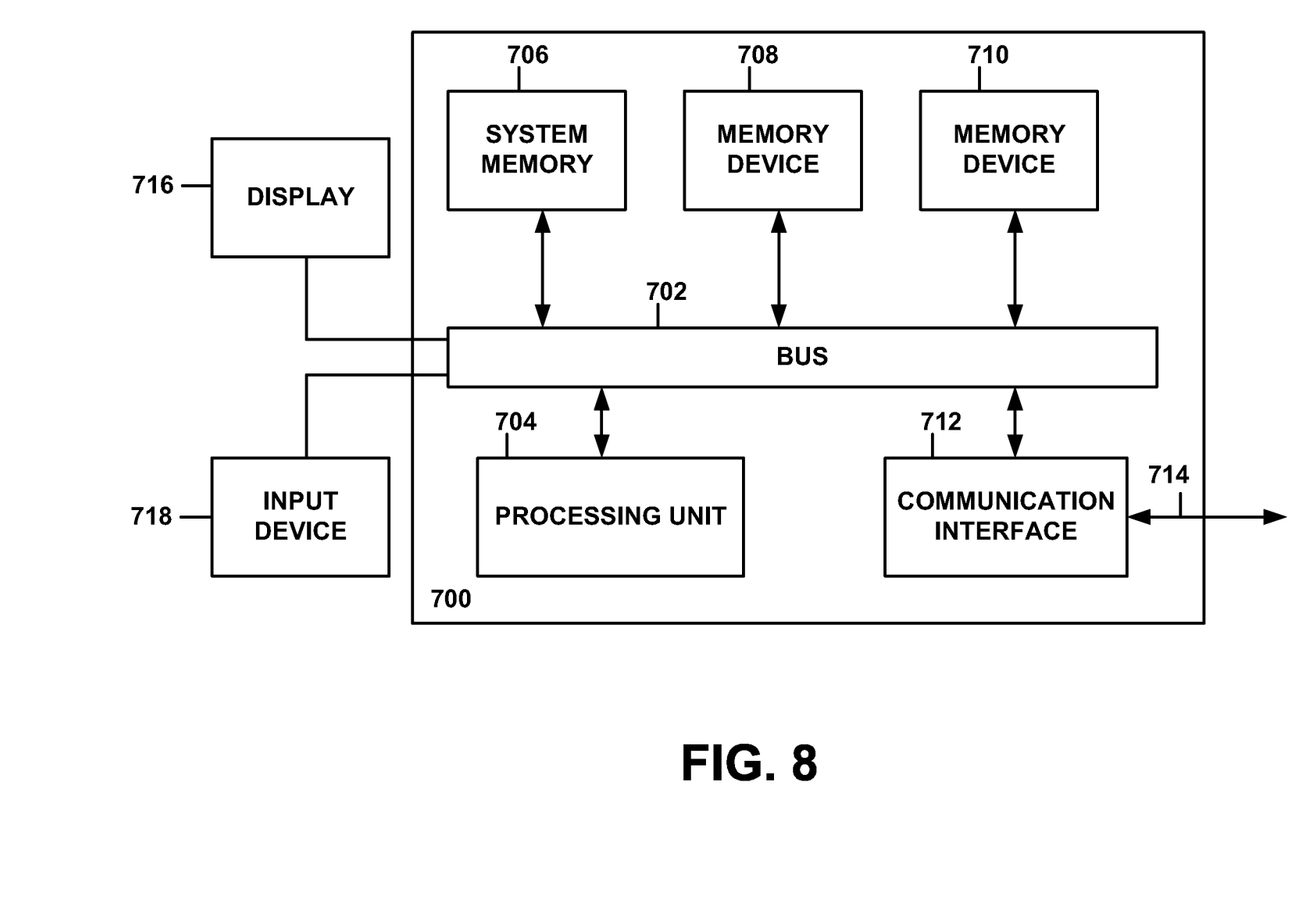
FIG. 8 illustrates an example of a computer system that can be employed to implement the systems and methods illustrated in FIGS. 1-7.

FIG. 8 is a schematic block diagram illustrating an example system 700 of hardware components capable of implementing examples disclosed in FIGS. 1-7, such as the printer controller 12 as well as portions of the printer 4 illustrated in FIG. 1 and/or the scanner 30 illustrated in FIG. 1. The system 700 can include various systems and subsystems. The system 700 can be a personal computer, a laptop computer, a workstation, a computer system, an appliance, an application-specific integrated circuit (ASIC), a server, a server blade center, a server farm, a mobile device, such as a smart phone, a personal digital assistant, an interactive television set, an Internet appliance, portions of a printer, etc.

The system 700 can include a system bus 702, a processing unit 704, a system memory 706, memory devices 708 and 710, a communication interface 712 (e.g., a network interface), a communication link 714, a display 716 (e.g., a video screen), and an input device 718 (e.g., a keyboard and/or a mouse). The system bus 702 can be in communication with the processing unit 704 and the system memory 706. The additional memory devices 708 and 710, such as a hard disk drive, server, stand alone database, or other non-volatile memory, can also be in communication with the system bus 702. The system bus 702 operably interconnects the processing unit 704, the memory devices 706-710, the communication interface 712, the display 716, and the input device 718. In some examples, the system bus 702 also operably interconnects an additional port (not shown), such as a universal serial bus (USB) port.

The processing unit 704 can be a computing device and can include an application-specific integrated circuit (ASIC). The processing unit 704 executes a set of instructions to implement the operations of examples disclosed herein. The processing unit can include a processor core.

The additional memory devices 706, 708 and 710 can store data, programs, instructions, database queries in text or compiled form, and any other information that can be needed to operate a computer. The memories 706, 708 and 710 can be implemented as computer-readable media (integrated or removable) such as a memory card, disk drive, compact disk (CD), or server accessible over a network. In certain examples, the memories 706, 708 and 710 can comprise text, images, video, and/or audio.

Additionally, the memory devices 708 and 710 can serve as databases or data storage such as the data storage 560 illustrated in FIG. 5 and/or the memory 14 or 552 illustrated in FIGS. 1 and 5. Additionally or alternatively, the system 700 can access an external system (e.g., a web service) through the communication interface 712, which can communicate with the system bus 702 and the communication link 714.

In operation, the system 700 can be used to implement, for example, a printer, a printer controller and/or a scanner. Machine (e.g., computer) executable logic for implementing the system, such as the memory 14 of the printer controller 12 illustrated in FIG. 1 and or the memory 14 of the printer controller 550 illustrated in FIG. 5, can reside in the system memory 706, and/or in the memory devices 708 and/or 710 in accordance with certain examples. The processing unit 704 executes machine readable instructions originating from the system memory 706 and the memory devices 708 and 710. In such an example, the system memory 706 and/or the memory devices 708 and/or 710 could be employed, for example, to implement the memory 14 illustrated in FIG. 1 and/or the memory 552 illustrated in FIG. 5. The term "computer readable medium" as used herein refers to a medium that participates in providing instructions to the processing unit 704 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A system comprising:
 a memory to store machine readable instructions;
 a processing unit to access the memory and execute the machine readable instructions, the machine readable instructions comprising:
  a press color state (PCS) estimator to:
   receive section measurement data characterizing a color measurement of multiple copies of a scanned section of a plurality of documents printed for a print job provided by a scanner, each printed document of the plurality of documents including the same printed material within the scanned section;
   calculate an optical density for each of four single separation solid colors based on the color measurement, the color measurement characterizing material printed on a substrate and scanned by the scanner, wherein each of the four single separation solid colors is one of a single ink or toner printable by a printer;
   calculate a color deviation for each of the four single separation colors based on the section measurement data;
   calculate an optical density drift for each of four single separation solid colors based on the color deviation for each of the four single separation colors; and
   provide an updated LUT for each of the four single separation colors based on the color measurement provided by the scanner; and a print controller to provide an updated optical density for each of the four single separation solid colors and the updated LUT to the printer to facilitate color calibration of the printer.

2. The system of claim 1, wherein the PCS estimator is further to command the print controller to cause the printer to print a set of test patches for each of the four single separation colors.

3. The system of claim 2, wherein the PCS estimator is further to calculate a spectral reflectance for each of the four single separation colors based on the Yule-Nielson print model for each of the four single separation colors.

4. The system of claim 2, wherein the set of test patch comprises a plurality of test patches, each test patch of the plurality of test patches comprising a different percentage of color coverage for each of the four solid separation colors.

5. The system of claim 1, wherein the PCS estimator is further to receive section measurement data characterizing a color measurement of a scanned section of a document printed for a print job, wherein each page printed for the print job is different.

6. The system of claim 1, wherein the scanner comprises an in-line scanner integrated with the printer and the scanner is to operate in a no color pipeline mode.

7. The system of claim 1, wherein the PCS estimator is further to calculate the color deviation for each of the four single separation colors based on a comparison of the optical density of the four separation solid colors for a given document printed by the printer and the other document printed by the printer.

8. The system of claim 1, wherein the four solid separation colors are cyan, yellow, magenta and black.

9. A system comprising:
a memory to store machine readable instructions; and
a processing unit to access the memory and execute the machine readable instructions, the machine readable instructions comprising:
a press color state (PCS) estimator to:
calculate an optical density for each of four single separation solid colors based on a color measurement provided by a scanner, the color measurement characterizing material printed on a substrate and scanned by a scanner;
print a set of test patches for each of the four single separation colors;
calculate a conversion coefficient for each test patch in the set of test patches of each of the four single separation colors based on the color measurement and based on the Yule-Nielson print model; and
provide an updated LUT for each of the four single separation colors based on the color measurement provided by the scanner; and
a print controller to provide an updated optical density for each of the four single separation solid colors and the updated LUT to a printer to facilitate color calibration of the printer.

10. A system comprising:
a memory to store machine readable instructions;
a processing unit to access the memory and execute the machine readable instructions, the machine readable instructions comprising:
a press color state (PCS) estimator to:
receive section measurement data characterizing a color measurement of multiple copies of a scanned section of a plurality of documents printed for a print job provided by a scanner, each printed document of the plurality of documents including the same printed material within the scanned section;
calculate an optical density for each of four single separation solid colors based on the color measurement, the color measurement characterizing material printed on a substrate and scanned by the scanner, wherein each of the four single separation solid colors is one of a single ink or toner printable by a printer;
employ a Taylor series polynomial to calculate a color deviation for each of the four single separation colors based on the section measurement data; and
provide an updated LUT for each of the four single separation colors based on the color measurement provided by the scanner; and
a print controller to provide an updated optical density for each of the four single separation solid colors and the updated LUT to the printer to facilitate color calibration of the printer.

11. The system of claim 10, wherein the PCS estimator is further to calculate an optical density drift for each of four single separation solid colors based on the color deviation for each of the four single separation colors.

12. A method comprising:
parsing a document by a press color state (PCS) estimator executed by a computing device to determine if test patches are needed to continuously color calibrate a printer;
calculating a color deviation for each of the four single separation colors based on a comparison of the optical density of the four separation solid colors for a given document printed by a printer and another document printed by the printer, wherein each of the four single separation solid colors is one of a single ink or toner printable by a printer;
receiving a color measurement for each of a set of test patches for each of the four single separation colors;
calculating a spectral reflectance for each of the four single separation colors based on the Yule-Nielson print model and based on the color measurement for each set of test patches of the four single separation colors; and
providing an optical density of each of four single separation solid colors and an updated LUT of four single separation colors based on color measurements provided by an in-line scanner integrated with the printer, the updated LUT employed to continue a print job.

13. The method of claim 12, wherein the determining is based on an existence of a plurality of sections in the document for the print job comprising a relatively flat color over the section.

14. The method of claim 13, further comprising:
receiving section measurement data from the scanner that characterizes multiple copies of a given section of the plurality of sections in the document; and
calculating a color deviation in the multiples copies of the section based on the section measurement data.

15. The method of claim 12, wherein the four solid separation colors are cyan, yellow, magenta and black.

16. The method of claim 12, further comprising receiving section measurement data characterizing a color measurement of a scanned section of each of the given document and the other document, each document including the same printed material within the scanned section.

17. A system comprising:
a printer having ink deposited therein;
an in-line scanner coupled to the printer to take color measurements; and a printer controller comprising:
   a memory to store machine readable instructions; and
   a processing unit to access the memory and execute the machine readable instructions, the machine readable instructions comprising:
      a print controller to control the printer to print multiple copies of a document for a print job; and
      a press color state (PCS) estimator to:
         receive patch measurement data from the scanner that characterizes color measurements for each set of test patches for each of four single separation colors;
         calculate conversion coefficients derived from the Yule-Nielson print model for each test patch in each set of test patches of each of the four single separation colors;
         calculate a spectral reflectance based on the conversion coefficients for each of the four single separation colors;
         receive section measurement data from the scanner that characterizes multiple color measurements for a section of the document with a relatively flat color over the section;
         calculate a color deviation for each of the four single separation colors based on the section measurement data;
         calculate a drift in solid colors for each of the four single separation colors based on the color deviation for each of the four single separation colors; and
         calculate an optical density for each of four single separation solid colors.

* * * * *